United States Patent
Takeda et al.

(10) Patent No.: US 6,704,096 B1
(45) Date of Patent: Mar. 9, 2004

(54) EXPOSURE APPARATUS AND EXPOSURE METHOD

(75) Inventors: Minoru Takeda, Tokyo (JP); Motohiro Furuki, Tokyo (JP); Shingo Imanishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 291 days.

(21) Appl. No.: 09/619,996

(22) Filed: Jul. 20, 2000

(30) Foreign Application Priority Data

Jul. 29, 1999 (JP) ......................................... P11-214562

(51) Int. Cl.[7] .............................. G03B 27/72; G11B 7/00
(52) U.S. Cl. ........................ 355/71; 369/44.38; 369/99; 369/121
(58) Field of Search .............................. 355/71; 369/99, 369/100, 112.02, 112.08, 112.13, 112.23, 121, 122, 44.38

(56) References Cited

U.S. PATENT DOCUMENTS

| | | | | |
|---|---|---|---|---|
| 5,353,292 A | * | 10/1994 | Motegi | 372/21 |
| 5,581,395 A | * | 12/1996 | Tonosaki et al. | 359/326 |
| 5,625,633 A | * | 4/1997 | Ichimura et al. | 372/32 |
| 5,717,676 A | * | 2/1998 | Kaneda et al. | 369/116 |
| 5,737,281 A | * | 4/1998 | Takeda et al. | 369/14 |
| 5,822,287 A | * | 10/1998 | Kubota et al. | 369/44.38 |
| 5,905,699 A | * | 5/1999 | Ishibashi | 369/44.26 |
| 5,936,761 A | * | 8/1999 | Kubota et al. | 359/328 |
| 5,943,350 A | * | 8/1999 | Shichijyo | 372/21 |
| 6,075,656 A | * | 6/2000 | Bietry et al. | 359/717 |
| 6,146,251 A | * | 11/2000 | Fukui et al. | 451/42 |
| 6,181,461 B1 | * | 1/2001 | Wada et al. | 359/326 |
| 6,208,611 B1 | * | 3/2001 | Arima | 369/112.02 |
| 6,212,146 B1 | * | 4/2001 | Watanabe | 369/59 |
| 6,243,350 B1 | * | 6/2001 | Knight et al. | 369/126 |
| 6,298,018 B1 | * | 10/2001 | Takahashi et al. | 369/44.23 |

* cited by examiner

*Primary Examiner*—Rodney Fuller
(74) *Attorney, Agent, or Firm*—Oblon, Spivak, McClelland, Maier & Neustadt, P.C.

(57) ABSTRACT

In an exposure apparatus and an exposure method, a disc master to be used in the preparation of an optical disc is applied to an exposure device, making it possible to perform exposure on a disc master for an optical disc which is substantially improved in recording density. An exposure laser beam by SHG having a wavelength of 300 nm or less is modulated by a modulator, and applied by near field effect to a disc master by using an objective lens having a numerical aperture of 1.0 or more.

14 Claims, 5 Drawing Sheets

EXPOSURE APPARATUS AND EXPOSURE METHOD

BACKGROUND OF THE INVENTION

1. Field of the Invention

The present invention relates to an exposure apparatus and an exposure method which can be applied, for example, to an exposure apparatus for a disc master to be used to form an optical disc. An SHG exposure laser beam having a wavelength of 300 nm or less is modulated by a modulation means, and applied to a disc master by proximity effect using an objective lens of a numerical aperture of 1.0 or more, whereby an optical disc having a substantially higher recording density as compared to that of conventional discs is obtained. According to the present invention, it is possible to perform exposure on the disc master of such an optical disc.

2. Description of the Related Art

Conventionally, in the production of an optical disc, exposure is performed on a disc master by an exposure apparatus, and then the disc master is developed to prepare a mother disc, and a stamper is prepared from the mother disc for mass production of optical discs.

Figure 6:
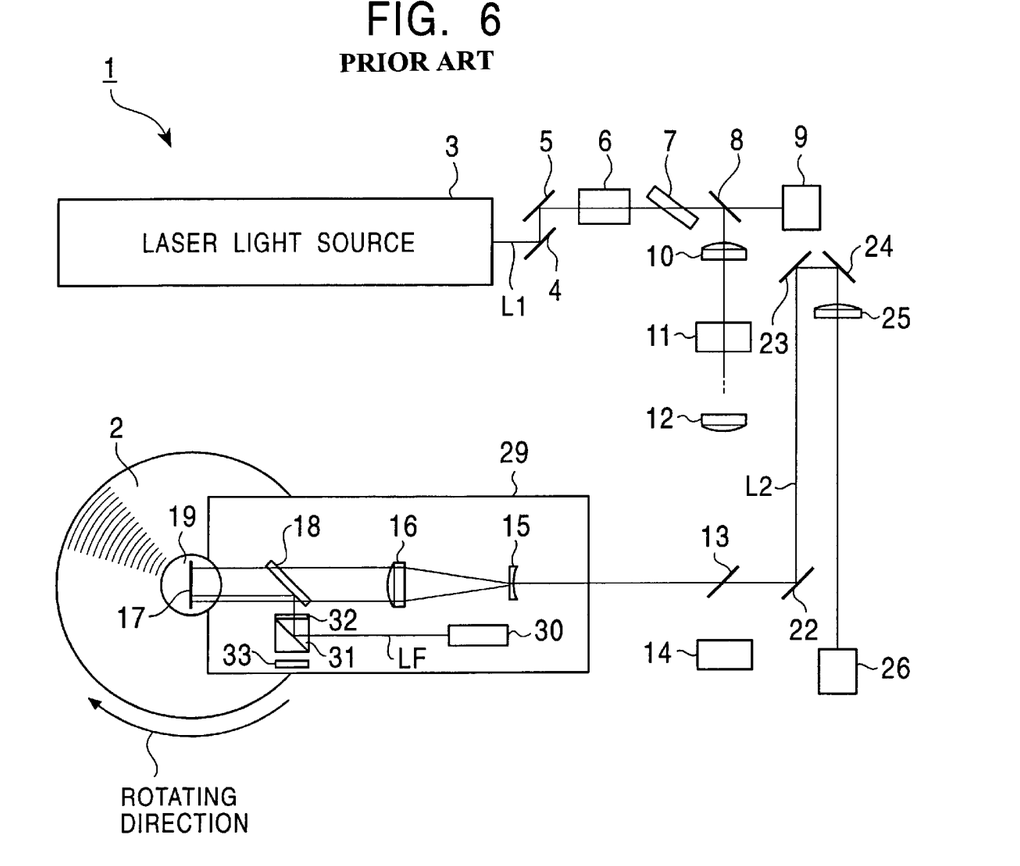
FIG. 6 is a plan view showing a conventional exposure apparatus.

FIG. 6 is a plan view of an exposure apparatus of this type seen from above. In this exposure apparatus 1, exposure is effected on a disc master 2 by an exposure laser beam, whereby a latent image corresponding to the pits and grooves is formed on the disc master 2.

To prepare the disc master 2, precision polishing is performed on a glass disc having a diameter of approximately 200 mm and a thickness of several mm, and a resist layer having a thickness of approximately 0.1 $\mu$m is formed thereon by spin coating of photoresist. As the photoresist, a photosensitive material exhibiting a sufficient sensitivity to the exposure laser beam is applied. The disc master 2 is attached to an air spindle through chucking and held by this exposure apparatus 1 to be rotated at a predetermined speed.

As the laser light source 3, a Kr ion laser, for example, is used, which emits a laser beam having a wavelength of 413 nm as an exposure laser beam L1. Mirrors 4 and 5 bends the optical path of the exposure laser beam L1 emitted from the laser light source 3 and leads it to an EOM (electro optic modulator) 6. The EOM 6 rotates the plane of polarization of the exposure laser beam L1 in response to a drive signal and emits the beam. Subsequently, a polarization beam splitter 7 selectively allows a predetermined polarization plane component of the exposure laser beam L1 to be transmitted.

A half mirror 8 divides the exposure laser beam L1 emitted from the polarization beam splitter 7 into two beams, and a photoreceptor 9 receives the beam transmitted through the half mirror 8 and outputs the light quantity detection result. In the exposure apparatus 1, the drive signal of the EOM 6 is corrected based on the light quantity detection result to thereby form an automatic light quantity control circuit, effecting control such that the light quantity of the exposure laser beam L1 is kept constant.

A lens 10 condenses the exposure laser beam L1 reflected by the half mirror 8 and inputs it to an AOM (acousto optic modulator) 11, which ON/OFF-modulates the exposure laser beam L1 by a modulation signal corresponding to a pit row. Subsequently, a lens 12 converts the beam output from the acousto optic modulator 11 to a parallel beam and outputs it. A half mirror 13 divides the beam output from the lens 12 into two beams. A photoreceptor 14 receives one of the two beams and outputs the reception result, whereby in the exposure apparatus 1, the result of modulation of the exposure laser beam L1 by the acousto optic modulator 11 can be monitored.

On the other hand, a concave lens 15 outputs the other one of the two beams obtained through division by the half mirror 13 as a diverging ray. Subsequently, a convex lens 16 converts the diverging ray to a parallel beam. Thus, the concave lens 15 and the convex lens 16 constitute a beam expander, and outputs the exposure laser beam L1 after setting the beam diameter to a predetermined value.

Figure 7:
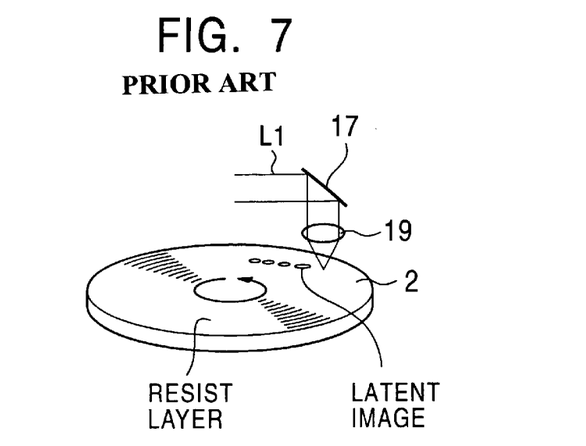
FIG. 7 is a perspective view illustrating the operation of the exposure apparatus of FIG. 6.

A mirror 17 receives the exposure laser beam L1 from the beam expander through beam splitter 18, and emits this exposure laser beam L1 toward the disc master 2. An objective lens 19 is formed by a lens similar to the objective lens of a microscope. As shown in FIG. 7, the exposure laser beam L1 whose optical path has been bent by the mirror 17 is condensed on the resist layer of the disc master 2 to thereby form a pit latent image.

When thus performing exposure on the disc master 2 by the exposure apparatus 1, the exposure laser beam L1 is reflected by the resist layer of the disc master 2, and the resulting return beam L2 travels in the opposite direction through the optical path of the exposure laser beam L1 to impinge upon the half mirror 13. Mirrors 22, 23 and 24 sequentially bend the optical path of the return beam transmitted through the half mirror 13, and a lens 25 guides the return beam reflected by the mirror 23 to an imaging device 26 consisting of a CCD camera. The imaging device 26 receives this return light to thereby detect the beam configuration of the exposure laser beam L1 on the resist layer of the disc master 2. Due to this arrangement, the exposure apparatus 1 can monitor to check as to whether the focus control is correctly effected or not through the observation of the beam configuration. Further, it is possible to set the control target in the focus control.

In the exposure apparatus 1, the optical system from the laser light source 3 to the half mirror 13, which processes the exposure laser beam L1, and the optical system from the half mirror 13 to the imaging device 26, which receives the return beam, are secured to an optical base plate which is the base of this exposure apparatus. In contrast, the optical system from the concave lens 15 to the objective lens 19 is arranged on a movable optical table 29, which can move in the radial direction of the disc master 2 by means of a predetermined drive mechanism. Due to this arrangement, in the exposure apparatus 1, the movable optical table 29 is gradually moved in the peripheral direction of the disc master 2, with the disc master 2 rotating, whereby the scanning trail of the exposure laser beam is spirally formed on the disc master 2, and a pit row latent image according to the modulation by the acousto optic modulator 11 is formed on this scanning track.

In the exposure apparatus 1, there is further formed an auto focus optical system on the movable optical table 29. In the auto focus optical system, a laser diode 30 emits a laser beam LF having a wavelength of, for example, 680 nm, and a polarization beam splitter 31 reflects this laser beam LF and emits it to a dichroic mirror 17. A ¼ wavelength plate 32 imparts a phase difference to the laser beam LF emitted from the polarization beam splitter 31 before emitting it, and a beam splitter 18 synthesizes the laser beam LF with the exposure laser beam LR before emitting it to the mirror 17. Thus, in the auto focus optical system, the laser beam LF is applied to the disc master 2 together with the exposure laser beam LR.

The laser beam LF, which has a beam diameter much smaller than that of the exposure laser beam LR, is synthesized with the exposure laser beam LR. Further, the synthesis is effected such that the optical axis of the laser beam LF is spaced apart from the optical axis of the exposure laser beam LR, the optical axis of which substantially coincides with the optical axis of the optical system including the objective lens 19, etc.

Due to this arrangement, in the auto focus optical system, regarding the return beam, which is obtained through specular reflection at the resist layer of the disc master 2 of the laser beam LF obliquely impinging upon the disc master 2, the position of the optical axis varies according to the distance between the objective lens 19 and the resist layer. Regarding the return beam thus obtained, the auto focus optical system imparts a phase difference thereto when it reversely travels through the optical path of the laser beam LF and is transmitted through the ¼ wavelength plate 32, whereby the laser beam LF is subsequently separated by the polarization beam splitter 32. The beam is further received by a position detecting device 33, and the distance between the objective lens 19 and the resist layer is detected from the light receiving position.

In the auto focus optical system, the optical axis position, etc. of the laser beam LF is adjusted such that the variation in the condensing position of the return beam at the position detecting device is approximately 100 times the variation in the distance between the objective lens 19 and the resist layer, and the objective lens 19 is displaced in the optical axis direction to thereby effect focus control.

The exposure apparatus 1 is mounted on an air base plate so that the optical systems and the mechanical system may not be affected by external vibrations of the place of installment, whereby the exposure accuracy can be improved.

In the exposure apparatus 1, which performs exposure on the disc master 2 in this way, assuming that the resolution is P, P=K·(λ/NA), where NA is the numerical aperture of the objective lens 19, K is the process factor (usually 0.8 to 0.9) due to resist characteristics, etc., and λ is the wavelength of the exposure laser beam L1. Thus, for example, in a DVD having a diameter of 12 cm and an information capacity on one side of 4.7 GB, a pit row latent image is prepared in a minimum pit length of 0.4 µm and a track pitch of 0.74 µm to secure a resolution P=0.37 µm by using an exposure laser beam having a wavelength of 413 nm and an objective lens 19 of a numerical aperture NA=0.9.

Regarding optical discs, with the recent rapid development in information/communication techniques and image processing techniques, there is a demand for an increase in capacity.

When an information capacity of 15 GB on one side is to be secured using, for example, a disc having the same diameter as DVD (12 cm) and in the same format as DVD, this capacity can be secured forming a pit row in a minimum pit length of 0.22 µm and a track pitch of 0.41 µm.

In this case, in the exposure apparatus, it is necessary to secure a resolution corresponding to the minimum pit length from the above formula of the resolution P. Regarding the numerical aperture NA, the present NA=0.9 is to be considered as the limit from the accuracy in lens design. Thus, by reducing the wavelength of the exposure laser beam and using a far-ultraviolet radiation laser having a wavelength of approximately 250 nm, it is possible to secure the capacity of 15 GB.

However, to further increase the recording capacity and secure an information capacity on one side of, for example, 40 GB in the diameter of 12 cm, it is not enough to simply reduce the wavelength of the exposure laser beam L1.

That is, to secure an information capacity on one side of 40 GB in the diameter of 12 cm, assuming that recording is to be performed in the same format as DVD, it is necessary to form a pit row in a minimum pit length of 0.14 µm and a track pitch of 0.25 µm.

SUMMARY OF THE INVENTION

The present invention has been made in view of the above problem. Accordingly, it is an object of the present invention to provide an exposure apparatus and an exposure method for an optical disc in which recording density has been substantially increased.

In an exemplary embodiment, an SHG exposure laser beam having a wavelength of 300 nm or less is used, so that it is possible to emit a laser beam having a short wavelength and suitable for exposure, using a small size light source. Further, by applying an exposure laser beam to a disc master by near field effect to a disc master by using an objective lens of a numerical aperture of 1.0 or more, it is possible to form a much more minute latent image, and perform exposure on a disc master for an optical disc in which the recording density has been substantially increased.

DESCRIPTION OF THE PREFERRED EMBODIMENTS

An embodiment of the present invention will now be described in detail with reference to the drawings.

(1) Construction of the Embodiment

Figure 1:
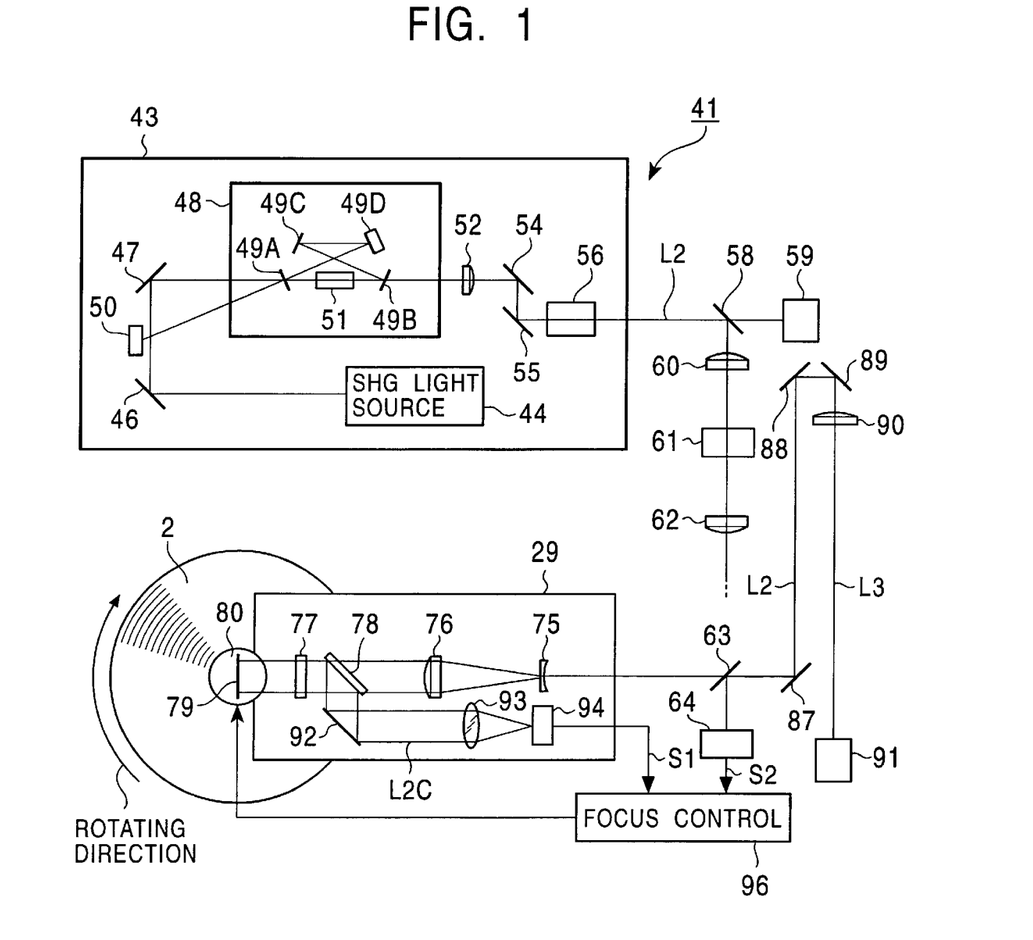
FIG. 1 is a plan view showing an exposure apparatus according to an embodiment of the present invention.

FIG. 1 is a plan view showing an exposure apparatus according to an embodiment of the present invention. In this exposure apparatus 41, exposure is performed on a disc master 2 through NFR (near field recording) by using an exposure laser beam having a wavelength of 266 nm emitted from a laser source 43. In this exposure apparatus 41, the components which are the same as those of the exposure apparatus described with reference to FIG. 6 are indicated by the same reference numerals and a description of such components will be omitted.

In the laser light source 43, an SHG light source 44 causes a YAG laser (having a wavelength of 1064 nm) to impinge upon a built-in SHG (second harmonic generation) crystal and emits a harmonic which is double the same to thereby emit a laser beam having a wavelength of 532 nm. Mirrors 46 and 47 bend the optical path of this laser beam and cause it to impinge upon an external resonator 48.

In the external resonator 48, half mirrors 49A and 49B, opposed to each other, and mirrors 49C and 49D form an optical resonator, and of these four mirrors 49A through 49D, one mirror 49D moves by an actuator of a VCM (voice coil motor) construction to thereby adjust the resonance frequency of the optical resonator. In the external resonator 48, this actuator is driven based on the light quantity detection result obtained by detecting the reflected light from the mirror 49D through the half mirror 49A by a photo detector 50, whereby a laser beam of 532 nm is amplified.

In the external resonator 48, a BBO ($\beta$-$B_aB_2O_4$) crystal 51, which is a non-linear type optical element, is arranged between the half mirrors 49A and 49B, whereby there is generated an exposure laser beam L2 having a wavelength of 266 nm, which is ½ of the wavelength of 532 nm. The external resonator 48 allows the laser beam to be transmitted through the half mirror 49B to emit this exposure laser beam L2.

Due to this arrangement, in the external resonator 48, it is possible to emit an exposure laser beam L2 having a wavelength of 266 nm by an output of 20 mW, which is sufficient for the exposure of the disc master 2, by using a laser beam having a wavelength of 532 nm by an output of 200 mW. The exposure laser beam L2 thus obtained can be oscillated in a single mode and has a high coherency which is high in terms of both space and time. Regarding the frequency noise, it is possible to secure an RIN value of not more than 115 dB/Hz in the frequency range of 100 Hz to 2 MHz.

A lens 52 converts this exposure laser beam L2 to a substantially parallel beam and emits it. Then, mirrors 54 and 55 bend the optical path of the exposure laser beam L2. An anamorphic optical system, subsequent thereto, comprises an anamorphic prism, etc., and shapes the beam configuration of the exposure laser beam L2 before emitting it.

A half mirror 58 divides the laser beam L2 thus emitted from the laser light source 43 into two beams, and a photo detector 59 receives the beam transmitted through the half mirror 58 to output the result of light quantity detection. In the exposure apparatus 41, the light quantity of the exposure laser beam L2 can be monitored on the basis of the light quantity detection result.

A lens 60 condenses the exposure laser beam L2 reflected by the half mirror 58 and causes it to impinge upon an acousto optic modulator 61.

The acousto optic modulator 61 is formed of fused silica or the like, which can secure sufficient transmissivity and diffraction efficiency with respect to the exposure laser beam L2, and performs ON/OFF control on the exposure laser beam L2 by a recording signal corresponding to the latent image of the pit row formed on the disc master 2 before outputting the beam. In this ON/OFF control, the light quantity of the exposure laser beam L2 is raised to a fixed light quantity based on the light reception result of a photo detector 64 described below, whereby the acousto optic modulator 61 constitutes a light modulator and, at the same time, constitutes a part of an automatic light quantity control mechanism. The acousto optic modulator 61 is capable of causing the exposure laser beam L1 to impinge thereon in a beam diameter of approximately 100 $\mu$m, securing a modulation frequency gand of approximately 30 MHz.

Subsequently, a lens 62 converts the beam emitted from the acousto optic modulator 61 to a parallel beam before emitting it, and a half mirror 63 divides the beam emitted from the lens 62 into two beams. A photo detector 64 receives one of the two beams obtained through division by the half mirror 63, and outputs the reception result, whereby the exposure apparatus can monitor the result of modulation of the laser beam L1 by the acousto optic modulator 61. Further, the reception result is used to control the light quantity of the exposure laser beam L2 and, further, utilized in focus control.

Figure 2:
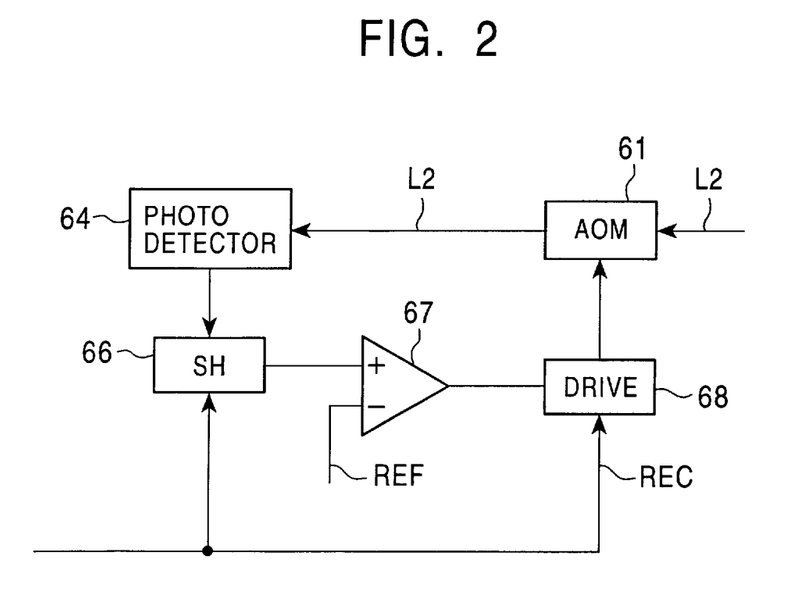
FIG. 2 is a block diagram showing an automatic light quantity control mechanism in the exposure apparatus of FIG. 1.

That is, as shown in FIG. 2, in the exposure apparatus 1, sample holding is performed on the reception result of the photo detector 64 by a sample hold circuit (SH) 66, using the recording signal REC corresponding to the pit row latent image as the reference, and the sample holding result is compared with the light quantity reference value REF by a comparison circuit 67. In response to the recording signal REC, a drive circuit 68 drives the acousto optic modulator 61 such that the light quantity of the exposure laser beam L2 emitted from the acousto optic modulator 61 is raised and, in this driving, the peak light quantity of the exposure laser beam L1 is controlled using the comparison result of the comparison circuit 67 as the reference, whereby in the exposure apparatus 1, the acousto optic modulator 61 is also used for automatic light quantity control, making it possible to reliably control the light quantity of the exposure laser beam L2 with a simple construction.

On the other hand, a concave lens 75 (FIG. 1) mounted on the movable optical table 29 emits the other one of the two beams obtained through division by the half mirror 63 in the form of a diverging ray. Subsequently, a convex lens 76 converts the diverging ray to a parallel beam, whereby the concave lens 75 and the convex lens 76 constitute a beam expander, emitting the exposure laser beam L1 with its beam diameter being 10 to 20 times as large as the original diameter.

A ¼ wavelength plate 77 receives the exposure laser beam L2 emitted from the beam expander through a half mirror 78, and emits this exposure laser beam L2 after converting it to circularly polarized light. Subsequently, a mirror 79 bends the optical path of the exposure laser beam L2 and causes it to impinge upon the entrance pupil of an objective lens 80.

Figure 3:
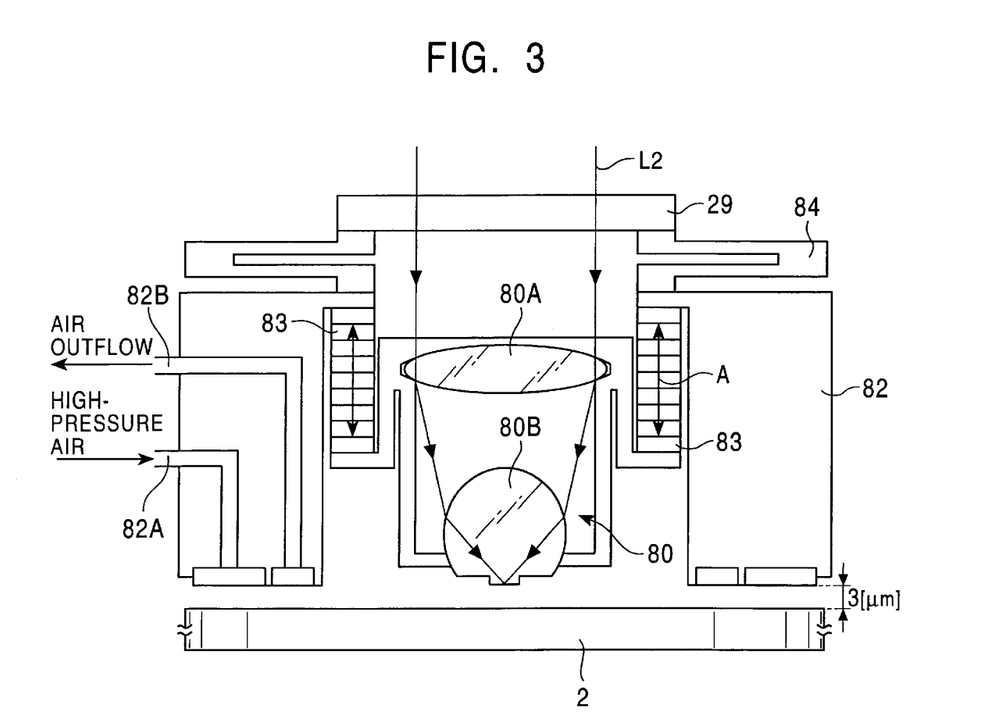
FIG. 3 is a sectional view showing the construction of the periphery of an objective lens in the exposure apparatus of FIG. 1.

As shown in FIG. 3, the objective lens 80 is formed by combining a so-called rear lens 80A and a front lens 80B. The rear lens 80A is formed, for example, by a single biconvex lens having an aspherical surface or a combination of a plurality of spherical lenses. The front lens 80B, in contrast, is formed as an SIL type semi-spherical lens, having at the center of its forward end portion a protrusion of 40 $\mu$m$\phi$, adhesion to the disc master 2 being prevented by this protrusion.

The rear lens 80A and the front lens 80B are formed by a material exhibiting sufficiently high transmissivity at a wavelength of 266 nm, for example, fused silica, the exposure laser beam L2 being condensed on the plane at the forward end of the protrusion formed on the front lens 80B. In this objective lens 80, the general numerical aperture can be expressed as $n^2 \times NA$, using the numeral aperture NA of the rear lens 80A and the refractive index n of the front lens 80B. In this embodiment, the numerical aperture NA of the rear lens 80A is set to 0.62, and the refractive index n of the front lens 80B, which is formed of fused silica, is 1.5 at the wavelength of 266 nm, so that the numerical aperture NA of the lens as a whole is set to 1.4.

Due to this arrangement, in the exposure apparatus 41, through the adoption of near field recording, the exposure laser beam L2 is condensed by a high numerical aperture of one or more to form a very minute beam spot. Further, by thus forming a beam spot and due to near field effect, the exposure laser beam L2 is applied to the resist layer of the disc master 2 arranged close to the front lens 80B by near field effect.

In doing so, the objective lens 80 is held close to the disc master 2 by a static pressure type flying pad 82 and a piezo actuator 83 such that near field effect can be obtained. That is, the static pressure type flying pad 82 is formed as a cylinder surrounding the objective lens 80 and held by the movable optical table 29 so as to be pressed against the disc master 2 through the intermediation of a plate spring 84. The static pressure type flying pad 82 has on its side a high pressure air inlet 82A, and the high pressure air flowing in through this inlet 82A is blown out from the end surface on the disc master 2 side, whereby it flies over the disc master 2.

Similarly, the static pressure type flying pad 82 has on its side an air outlet 82B, and this air outlet 82B is connected to a vacuum pump to allow air to flow out therethrough. Further, the air inlet is formed on the inner side of the end surface of the disc master 2 side and the air blow-out port, whereby the static pressure type flying pad 82 controls the amount of high pressure air blown out and the suction force by the vacuum pump so that the forward end on the disc master 2 side flies approximately 3 μm over the surface of the disc master 2.

The piezo actuator 83 is formed by stacking piezoelectric elements such that it can expand and contract according to the voltage applied thereto. The piezo actuator 83 is arranged in a ring-like manner on the inner side of the static pressure type flying pad 82, and the objective lens 80 is held by the static pressure type flying pad 82 through the intermediation of this piezo actuator 83, whereby the piezo actuator 83 expands and contracts as indicated by the arrow A according to the voltage applied thereto to vary the distance between the forward end of the objective lens 80 and the surface of the disc master 2. Due to this construction, the objective lens 80 can be accurately set at various distances, with the forward end on the disc master 2 side being within the range of several tens to several nm from the surface of the disc master 2.

Due to this arrangement, in the exposure apparatus 41, the return beam L3 of the exposure laser beam can be obtained from the objective lens 80 (FIG. 1), and this return beam L3 travels reversely through the optical path of the exposure laser beam to be guided to the optical system of the movable optical table 29. Of the optical system arranged on the movable optical table 29, the half mirror 78 arranged between the beam expander and the ¼ wavelength plate 77 divides this return beam into two beams.

Of the two beams obtained through division by the half mirror 78, the return beam transmitted through the half mirror 78 is caused to impinge upon the mirror 87 through the half mirror 63, and emitted therefrom with its optical path bent. Subsequently, the mirrors 88 and 89 similarly bend the optical path of the return beam, and the lens 90 guides the return beam L3 reflected by the mirror 89 to the imaging device 91. The imaging device 91 is formed by using a two-dimensional image sensor exhibiting sufficient sensitivity to a wavelength of 300 nm or less, and images the return beam to detect the beam configuration of the return beam, whereby the exposure apparatus 41 can monitor as to whether focus control is being effected correctly or not through the observation of the beam configuration and, further, it is possible to set a control target in focus control.

On the other hand, the mirror 92 mounted on the movable optical table 29 reflects, of the two beams obtained through division by the half mirror 78, the return beam reflected by the half mirror 78, thereby emitting the return beams with its optical path bent. The lens 93 causes this return beam to impinge upon the light receiving surface of the photo detector 94, and the photo detector 94 outputs the light quantity detection result S1, which is the result of receiving this return beam.

The optical system from the half mirror 79 to the photo detector 94 is arranged such that only the component impinging upon the output surface of the front lens 80B at an angle of incidence not smaller than the critical angle (that is, the component which has undergone total reflection at the output surface of the front lens 80B) is selectively guided to the photo detector 94 by partially masking the reflection surface of the mirror 92, the incident surface of the lens 93 or the output surface of the lens 93, or by a mask arranged in the optical path of the return beam L3.

The focus control circuit 96 performs focus control by driving the above-mentioned piezo actuator 83 on the basis of the light quantity detection result S1 of the return beam thus detected by the photo detector 94.

Figure 4:
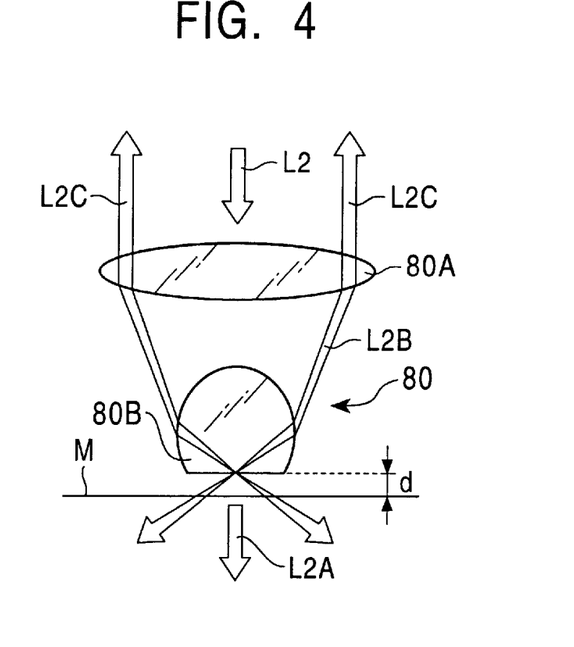
FIG. 4 is a schematic diagram illustrating focus control.

That is, as show in FIG. 4, in the objective lens 80, the focal point is formed in the output surface of the front lens 80B, and the numerical aperture NA is one or more, whereby the exposure laser beam L2 is condensed at a collection angle not smaller than the critical angle with respect to the output surface of the front lens 80B. When the distance d between the surface M of the disc master 2 and the output surface of the front lens 80B is sufficiently large, in the exposure laser beam L2 thus condensed at a collection angle not smaller than the critical angle, the component L2A impinging upon the output surface at an angle of incidence not larger than the collection angle is transmitted through the output surface and emitted to the disc master 2 side, whereas regarding the component L2B impinging upon the output surface at an angle of incidence not smaller than the critical angle, it undergoes total reflection at the output surface.

Figure 5:
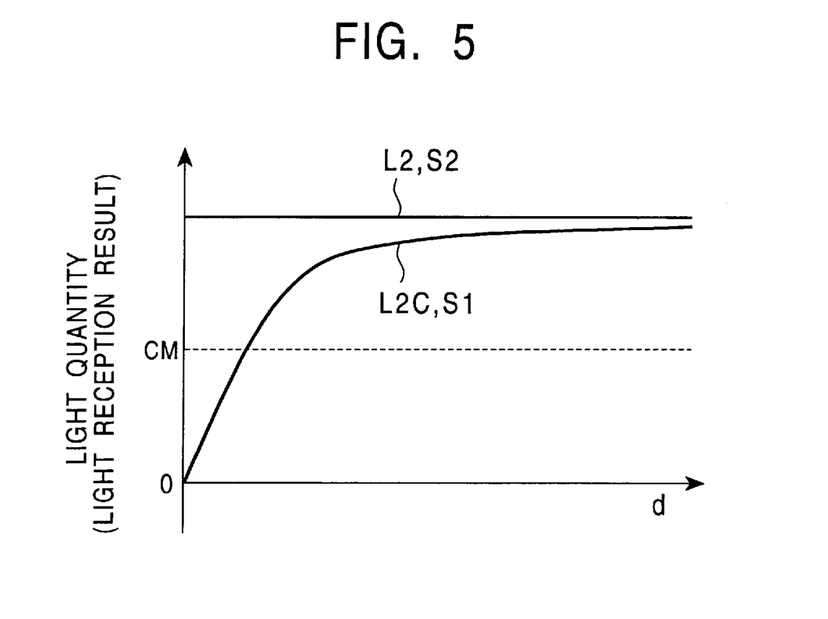
FIG. 5 is a characteristic curve chart showing variation in the light quantity of a return beam.

Thus, as shown in FIG. 5, when the distance d between the surface M of the disc master 2 and the output surface of the front lens 80B is gradually reduced until the distance d is smaller than the wavelength of the exposure laser beam L2, the component L2B impinging upon the output surface at an angle not smaller than the critical angle starts to gradually leak to the disc master 2 side by near field effect, and with this, the quantity of light (the component indicated by symbol L2C) returned to the light source side after total reflection is gradually reduced monotonously. When the output surface of the front lens 80B is completely brought to close contact with the disc master 2, the component L2B scarcely undergoes total reflection.

Thus, even in the case in which the piezo actuator 83 is driven so that the light quantity of the return beam L2C undergoing total reflection may attain a predetermined light quantity and in which the objective lens 80 is arranged very close to the disc master 2 to perform exposure on the disc master 2 by near field effect, it is possible to accurately perform focus control on the objective lens 80. Regarding the imaging result obtained by the above-mentioned imaging device 91, it is possible to monitor the condition of focus control, checking the light quantity distribution by visually observing the return beam L2C undergoing total reflection with the return beam from the disc master 2.

On this control principle, the focus control circuit 96 normalizes the light receiving result S1 obtained from the photo detector 94 from the light quantity detection result S2 of the exposure laser beam L2 obtained from the photo detector 64, whereby the variation in the light quantity of the return beam due to the variation in the light quantity of the exposure laser beam L2 is compensated for. Further, the focus control circuit 96 drives the piezo actuator 83 so that the normalized light quantity may attain a predetermined control target value CM.

(2) Operation of the Embodiment

In this exposure apparatus 41 (FIG. 1), constructed as described above, the disc master 2 is chucked on an air spindle and arranged on the turntable of this exposure apparatus to be rotated at a predetermined rotation speed. In this state, in the exposure apparatus 41, an exposure laser beam L2 having a wavelength of 266 nm is emitted from the laser light source 43, and this exposure laser beam L2 is ON/OFF modulated by the acousto optic modulator 61, which is a light modulator, and then applied to the disc master 2 by an optical system held by the movable optical table 29. In thus performing exposure on the disc master 2, in the exposure apparatus 41, the exposure laser beam L2 moves to the outer periphery of the disc master 2 in synchronism with the rotation of the disc master 2, whereby the scanning track of the exposure laser beam L2 is spirally formed on the disc master 2, and a pit row latent image corresponding to the ON/OFF modulation of the acousto optic modulator 61 is formed, whereby, in the disc master 2, there are formed by subsequent development minute protrusions and recesses corresponding to the latent image. Further, there is prepared a stamper through transfer of this recess/protrusion configuration, mass production of optical discs being possible by this stamper.

In the laser light source emitting the exposure laser beam L2 having a wavelength of 266 nm, a laser beam having a wavelength of 532 nm is generated by an SHG light source, and, further, in the external resonator 48, this exposure laser beam L2, which is a harmonic, by the BBO crystal 51, whereby the exposure laser beam L2 is generated by SHG. Thus. in the exposure apparatus 41, it is possible to generate a laser beam suitable for the exposure of the disc master 2 with a small size.

Such a laser beam having a wave length of near 266 nm can be emitted by excimer laser or gas laser. In the case of gas laser, the size of the light source is rather large, whereas, in the case of excimer laser, it is not suitable for the exposure of the disc master 2 because of pulse oscillation. In contrast, in the case of SHG, it is possible to achieve a reduction in size and emit a continuous and coherent laser beam, whereby it is possible to prevent the size of the exposure apparatus 41 from becoming too large, making it possible to perform exposure on the disc master 2 easily and reliably.

On the other hand, in the acousto optic modulator 61 (FIG. 2), sample holding is performed on the result of the reception of the output beam by the photo detector 64 using the recording signal REC as the reference, whereby the output light quantity of the exposure laser beam L1 in the ON state is detected, and driving is effected by the drive circuit 68 so that the output light quantity may be a light quantity which is determined by the reference value REF. Thus, in the exposure apparatus 41, the exposure laser beam L2 is modulated by the acoustic optical modulator using the recording signal and, at the same time, the light quantity is controlled.

That is, the light quantity control using the EOM described above with reference to FIG. 7 cannot be applied to a laser beam having a short wavelength. In this embodiment, in contrast, fused silica exhibiting a sufficient light transmissivity to an exposure laser beam having a wavelength of 266 nm is used, whereby it is possible to effect modulation reliably on this exposure laser beam and control the light quantity.

In the exposure apparatus 41, in the objective lens 80 (FIG. 3) condensing the exposure laser beam thus modulated, the numerical aperture is set to 1.4, that is, larger than 1, and the exposure laser beam L2 is condensed at the output surface of the front lens 80B. Further, exposure is performed on the disc master 2 by the exposure laser beam L2, which is arranged very close to the disc master 2 and which starts to leak from the output surface of the so-called front lens 80B by near field effect, whereby, in the exposure apparatus 41, it is possible to form a very minute pit configuration latent image by near field recording using an exposure laser beam L2 having a short wavelength.

Regarding the spot size, it can be expressed as $0.61 \lambda/NA$, where $\lambda$ is the wavelength and NA is the numerical aperture of the objective lens; in this embodiment, exposure is performed on the disc master 2 with a spot size of 120 nm, making it possible to prepare a latent image of pit configuration in a pit width of 120 nm. This pit size makes it possible to secure a recording density of 40 GB for an optical disc having a diameter of 12 cm.

In the exposure apparatus 41, this objective lens 80 is held by the movable optical table 29 by the static pressure type flying pad 82 through the intermediation of the piezo actuator 83, and held close to the disc master 2 through balancing between the air blown out from the forward end of the static pressure type flying pad 82 and the air sucked from this forward end. That is, in the exposure apparatus 41, the objective lens 80 is held close to the disc master 2 such that it flies over the disc master 2 by a fixed distance due to static pressure of air. In this flying by static pressure, by adjusting the amount of air discharged and sucked, it is possible to hold the objective lens 80 close to the disc master 2, effectively avoiding collision of the objective lens with the disc master 2, whereby in the exposure device 41, it is possible to form a minute latent image in a stable manner.

In the exposure laser beam L2 (FIG. 1) thus condensed on the output surface of the objective lens 80, the return beam is separated from the exposure laser beam L2 by the half mirror 63 and then imaged by the imaging device 91 to detect the light quantity distribution. Further, a part of the beam is separated from the exposure laser beam L2 by the half mirror 71, and received by the photo detector 94. On the light reception by the photo detector 94, only the component of the return beam which has impinged upon the output surface of the objective lens 80 at an angle of incidence not smaller than the critical angle is selectively received (FIG. 4).

In the return beam thus obtained, when the forward end of the objective lens 80 is brought close to the disc master 2 to exert near field effect, the light quantity varies according to the distance between the disc master 2 and the objective lens 80 (FIG. 5), whereby the exposure apparatus performs focus control by utilizing this relationship.

That is, in the exposure apparatus 41, the imaging result of the imaging device 91 is checked by the monitor device and the light quantity distribution of the return beam is checked, and while doing so, the application voltage of the piezo actuator 83 is varied to gradually bring the forward end of the objective lens 80 close to the disc master 2, making it possible to detect a so-called optimum focal position corresponding to the optimum distance to the disc master.

Thus, using the light reception result obtained from the photo detector 94 at this optimum focal position as the reference, focus control is effected by the focus control circuit 96, making it possible to perform focus control in a stable and reliable manner.

Thus, the imaging result of the return beam used in setting the control target in this focus control, and the light reception result of the total reflection return beam by the photo detector 94, can be utilized to check as to whether the exposure is being effected or not.

(3) Advantages of the Embodiment

In the above construction, an exposure laser beam by SHG having an wavelength of 266 nm, which is less than 300 nm, is modulated by an acousto optic modulator which is a modulating means and applied to a disc master by near field effect by using an objective lens having a numerical aperture of 1.4, which is more than 1.0, whereby it is possible to perform exposure on a disc master for an optical disc which is substantially improved in terms of recording density.

Further, since the acousto optic modulator is formed of fused silica, it is possible to perform exposure on a disc master 2, modulating an exposure laser beam having a wavelength of 266 nm in a stable and reliable manner.

Further, by constructing an automatic light quantity control mechanism using this acousto optic modulator, it is possible to perform exposure on a disc master 2, modulating an exposure laser beam having a wavelength of 266 nm in a stable and reliable manner.

Further, by separating the return beam by an exposure laser beam and detecting the light quantity by the photo detector 94, it is possible to check during exposure as to whether exposure is being correctly performed on the disc master 2 by near field effect or not.

Further, by performing focus control utilizing this light reception result, it is possible to perform exposure in a stable and reliable manner, holding the objective lens 80 very close to the disc master 2.

Further, by separating the return beam by the exposure laser beam and perform imaging by the imaging device 91, it is possible to appropriately set a control target in focus control. Further, during exposure, it is possible to check whether exposure is being correctly performed on the disc master 2 or not by near field effect.

(4) Other Embodiments

While in the above-described embodiment the objective lens is formed by two lenses, this should not be construed restrictively. It is also possible, for example, for the rear lens to be composed of a plurality of lenses.

Further, while in the above-described embodiment the objective lens and the acousto optic modulator are formed of fused silica, this should not be construed restrictively. Other lenses, mirrors, etc. may also be formed of fused silica.

Further, while in the above-described embodiment exposure is performed on the disc master by an exposure laser beam having a wavelength of 266 nm, this should not be construed restrictively. The same effect as that of the above-described embodiment can be obtained by applying the present invention to a case in which exposure is performed on the disc master by an exposure laser beam having a wavelength of not larger than 300 nm.

Further, while in the above-described embodiment the objective lens is held close to the disc master through a combination of the static pressure flying system and the piezo actuator, this should not be construed restrictively. The present invention can also be applied, for example, to a case in which the objective lens is held close to the disc master with a flying head construction.

Further, while in the above-described embodiment a pit row latent image is prepared on the disc master, this should not be construed restrictively. The present invention is also applicable to a case in which a groove latent image is prepared. In this case, it is possible to easily form a groove having a width of not larger than 200 nm.

As described above, in accordance with the present invention, an exposure laser beam having a wavelength of 300 nm or less by SHG is modulated by a modulating means, and applied to the disc master by using an objective lens of a numerical aperture of 1.0 or more by near field effect, whereby it is possible to perform exposure on a disc master for an optical disc which is substantially improved in terms of recording density.

What is claimed is:

1. An exposure apparatus for applying an exposure laser beam to a disc master to perform exposure on the disc master, comprising:

a laser light source for emitting the exposure laser beam having a wavelength of 300 nm or less by second harmonic generation;

modulating means for modulating the exposure laser beam;

an objective lens having a numerical aperture of 1.0 or more and adapted to apply the exposure laser beam modulated by the modulating means to the disc master by near field effect; and a static pressure flying pad and a piezo actuator, wherein a distance between the disc master and the objective lens is maintained at a substantially fixed distance by the static pressure flying pad and the piezo actuator.

2. An exposure apparatus according to claim 1, wherein the peak light quantity of the exposure laser beam is kept at a fixed value by the modulating means.

3. An exposure apparatus according to claim 1, wherein the modulating means is an acousto optic modulator.

4. An exposure apparatus according to claim 3, wherein the acousto optic modulator is formed of fused silica.

5. An exposure apparatus according to claim 1, further comprising:

light separation means for separating total reflection light returning through the optical path of the exposure beam after undergoing total reflection at the output surface of the objective lens from the exposure beam; and light receiving means for receiving the total reflection light separated by the light separation means to output the light quantity detection result.

6. An exposure apparatus according to claim 5, wherein the objective lens is focus-controlled based on the light quantity detection result.

7. An exposure apparatus according to claim 1, further comprising:

light separation means for separating the return beam from the disc master from the exposure laser beam; and imaging means for receiving the return beam separated by the light separation means to detect the light quantity separation in the return beam.

8. An exposure apparatus according to claim 1, wherein at least a part of the optical parts from the laser light source to the objective lens is formed of fused silica.

9. An exposure apparatus according to claim 1, wherein the distance between the disc master and the objective lens is maintained at a substantially fixed distance by the pressure of air blown out from a holding member holding the objective lens.

10. An exposure apparatus according to claim 1, wherein a latent image corresponding to a pit having a depth of 100 nm or less and a width of 200 nm or less is formed on the disc master by applying the exposure laser beam to the disc master.

11. An exposure apparatus according to claim 1, wherein a latent image corresponding to a groove having a depth of 100 nm or less and a width of 200 nm or less is formed on the disc master by applying the exposure laser beam to the disc master.

12. An exposure apparatus according to claim 1, wherein, the static pressure flying pad includes a high pressure air inlet on a first side, and a high pressure air flowing into the high pressure air inlet is blown out from an end surface of the static pressure flying pad such that the high pressure air flies over the disc master.

13. An exposure apparatus according to claim 1, wherein the piezo actuator is formed by stacking piezoelectric elements and is arranged in a ring-like manner on an inner side of the static pressure flying pad, and the object lens is held by the static pressure flying pad through an intermediation of the piezo actuator.

14. An exposure method for performing exposure on a disc master by applying an exposure laser beam to the disc master, comprising the steps of:

modulating the exposure laser beam having a wavelength of 300 nm or less by second harmonic generation;

applying the exposure laser beam to the disc master by near field effect using an objective lens having a numerical aperture of 1.0 or more; and maintaining a distance between the disc master and the objective lens at a substantially fixed distance by a static pressure flying pad and a piezo actuator.

* * * * *

UNITED STATES PATENT AND TRADEMARK OFFICE
CERTIFICATE OF CORRECTION

PATENT NO.   : 6,704,096 B1
DATED        : March 9, 2004
INVENTOR(S)  : Minoru Takeda et al.

It is certified that error appears in the above-identified patent and that said Letters Patent is hereby corrected as shown below:

Column 6,
Line 53, delete "xNA", and replace with -- x NA --.

Column 12,
Lines 53-57, delete claim 9 in its entirety, and renumber remaining claims accordingly.

Signed and Sealed this

Thirty-first Day of August, 2004

JON W. DUDAS
*Director of the United States Patent and Trademark Office*